(12) United States Patent
Grunow et al.

(10) Patent No.: US 7,815,228 B2
(45) Date of Patent: Oct. 19, 2010

(54) APPARATUS, SYSTEMS AND METHODS FOR DAMPING VIBRATION OF AN ELASTIC MEMBER WITHIN AN INFORMATION HANDLING SYSTEM LATCH

(75) Inventors: David William Grunow, Round Rock, TX (US); Richard C. Sohaney, Cedar Park, TX (US); Faiza Hassan, Austin, TX (US); Anil Damani, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 390 days.

(21) Appl. No.: 11/934,533

(22) Filed: Nov. 2, 2007

(65) Prior Publication Data
US 2009/0115197 A1    May 7, 2009

(51) Int. Cl.
*E05C 1/08* (2006.01)
*E05C 19/10* (2006.01)

(52) U.S. Cl. .................. 292/163; 292/121; 292/128; 292/DIG. 56; 292/DIG. 61; 292/DIG. 73

(58) Field of Classification Search ............... 292/137, 292/163, DIG. 56, DIG. 61, DIG. 73, 128
See application file for complete search history.

(56) References Cited

U.S. PATENT DOCUMENTS

| | | | | |
|---|---|---|---|---|
| 5,127,685 A | * | 7/1992 | Dallaire et al. ............. 292/175 |
| 5,465,191 A | * | 11/1995 | Nomura et al. ........ 361/679.27 |
| 5,544,925 A | * | 8/1996 | Ikeda .......................... 292/216 |
| 5,618,067 A | * | 4/1997 | Carlson et al. ............. 292/175 |
| 6,021,603 A | * | 2/2000 | Prete et al. ..................... 49/183 |
| 6,115,239 A | | 9/2000 | Kim |
| 6,411,505 B1 | | 6/2002 | DiFonzo et al. |
| 6,493,222 B2 | | 12/2002 | DiFonzo et al. |
| 6,570,757 B2 | | 5/2003 | DiFonzo et al. |
| 6,717,804 B1 | * | 4/2004 | Skinner ................. 361/679.55 |
| 6,965,512 B2 | * | 11/2005 | Huang et al. .......... 361/679.59 |
| 7,088,588 B2 | * | 8/2006 | Lee ............................. 361/725 |
| 7,111,773 B1 | | 9/2006 | So et al. |
| 7,431,355 B2 | * | 10/2008 | Eenigenburg et al. ....... 292/175 |
| 7,549,684 B2 | * | 6/2009 | Shi et al. ...................... 292/37 |
| 2006/0139146 A1 | | 6/2006 | Ito et al. |

FOREIGN PATENT DOCUMENTS

EP    1674355 A1    6/2006

\* cited by examiner

*Primary Examiner*—Carlos Lugo
(74) *Attorney, Agent, or Firm*—Garrana Tran, LLP

(57) ABSTRACT

A system, apparatus, and method for damping vibration of an elastic member within a latch for securing a top panel to a base of an information handling system (IHS) includes an elastic member with a first end and a second end, the first end attached to a fixed portion of the top panel. The latch may further include a body attachable to the top panel, the body defining a cavity for receiving the elastic member, wherein the body further comprises a movable anchor for attaching the second end of the elastic member and a raised portion, wherein the raised portion is in contact with the elastic member within the cavity to damp vibration of the elastic member. The latch further includes an actuation tab coupled to the body to engage the body in a movable position.

15 Claims, 8 Drawing Sheets

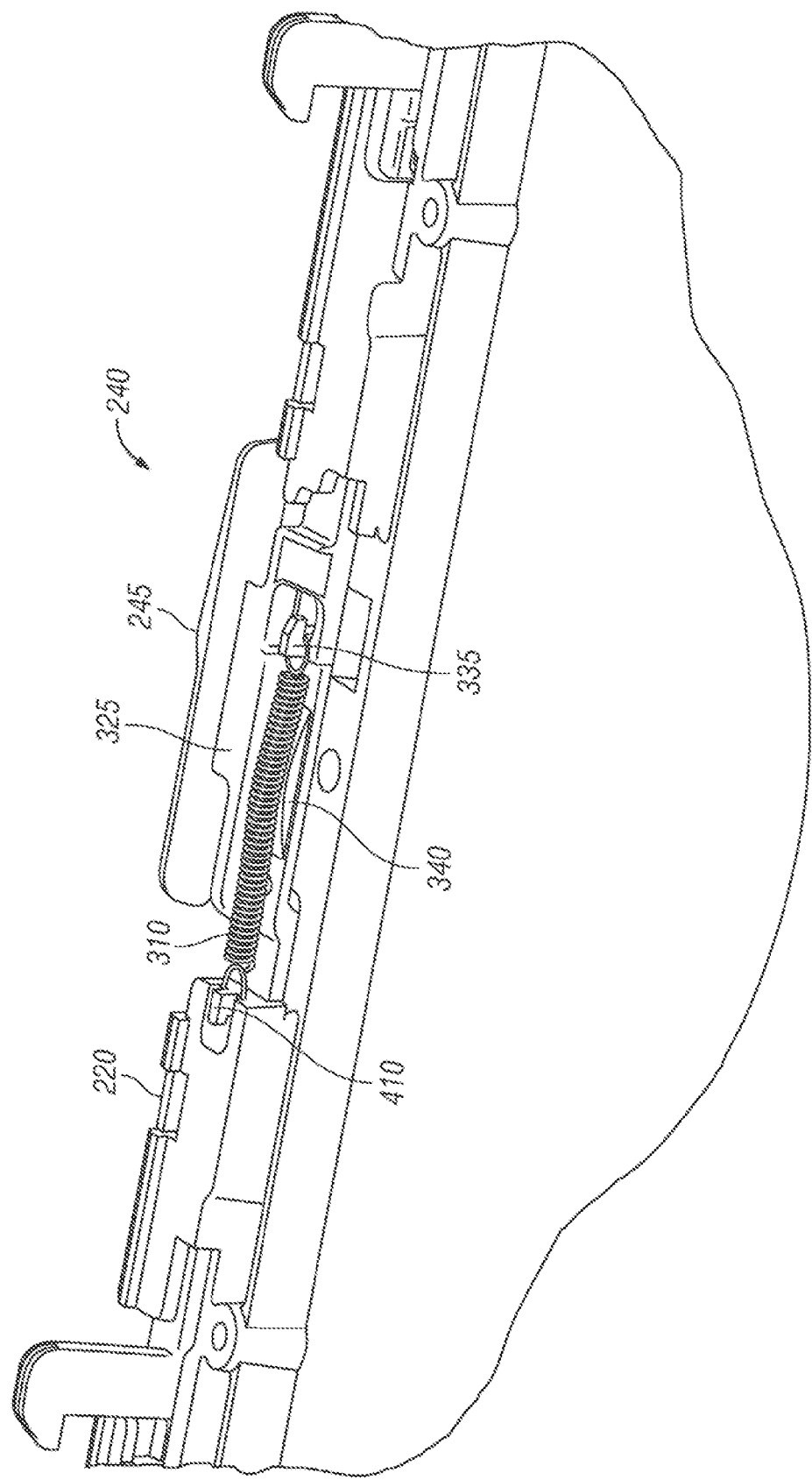

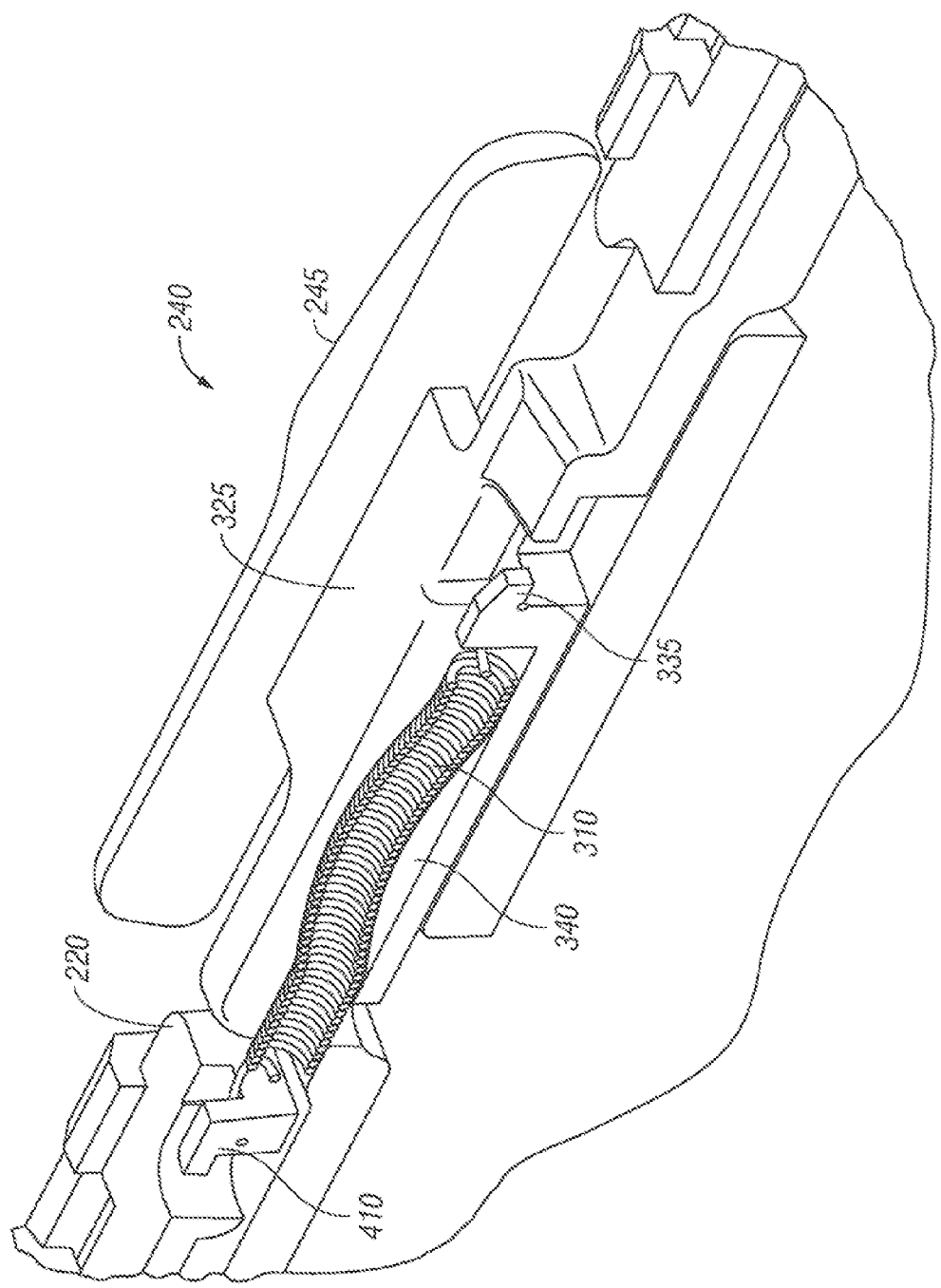

APPARATUS, SYSTEMS AND METHODS FOR DAMPING VIBRATION OF AN ELASTIC MEMBER WITHIN AN INFORMATION HANDLING SYSTEM LATCH

BACKGROUND

1. Technical Field

The present disclosure relates generally to the field of information handling systems. More specifically, but without limitation, the present disclosure relates to latches within portable information handling systems.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system (IHS) may exist in a portable format, such as a laptop. In some laptops, a latch which can be spring actuated, is used to secure the top to the base of the laptop. Spring actuated latches may produce an audible sound caused by the vibration of the spring when the latch is released. The audible sound, which may be described as a spring resonance sound or "twang", may give a cheap or low quality perception to a product.

Current methods and apparatus for reducing audible sound or vibration associated with spring actuated latches include the addition of parts to contact the spring, for example, a foam pad. However, the addition of parts to an IHS may present an increase in cost and assembly time. Furthermore, materials such as foam may wear down from the contact with the spring and may prevent proper operation of a spring due to catching.

Thus, a need remains for apparatus, systems and methods for damping spring vibration and/or sound utilizing design features integrated with the spring actuated latch.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the present disclosure provides a latch for securing a top panel to a base of an information handling system (IHS), the latch including an elastic member with a first end and a second end, the first end attached to a fixed portion of the top panel. The latch may also include a body attachable to the top panel, the body defining a cavity for receiving the elastic member, wherein the body further comprises one or more extensions for engaging with the base of the IHS. The body further comprises a movable anchor for attaching the second end of the elastic member and a raised portion, wherein the raised portion is integral to the body, and the raised portion is in contact with the elastic member within the cavity to damp vibration of the elastic member and an actuation tab coupled to the body to engage the body in a movable position.

Another aspect of the present disclosure provides a portable information handling system (IHS) comprising a top panel and a base wherein the base is pivotally coupled to the top panel at an attachment point. The portable IHS may also include a latch for securing a top panel to a base of the portable IHS, the latch including an elastic member with a first end and a second end, the first end attached to a fixed portion of the top panel. The latch may also include a body attachable to the top panel, the body defining a cavity for receiving the elastic member, wherein the body further includes one or more extensions for engaging with the base of the IHS. The body further includes a movable anchor for attaching the second end of the elastic member and a raised portion, wherein the raised portion is integral to the body, and the raised portion is in contact with the elastic member within the cavity to damp vibration of the elastic member and an actuation tab coupled to the body to engage the body in a movable position.

Yet another illustrative aspect provides a method for damping vibration of an elastic member within a latch of an information handling system (IHS) where the method includes providing the latch for securing a top panel to a base of the portable IHS, the latch including an elastic member with a first end and a second end, the first end attached to a fixed portion of the top panel a body attachable to the top panel, the body defining a cavity for receiving the elastic member wherein the body further includes a movable anchor for attaching the second end of the elastic member and a raised portion, wherein the raised portion is in contact with the elastic member within the cavity to damp vibration of the elastic member and an actuation tab coupled to the body to engage the body in a movable position.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein:

FIG. 6 illustrates an elastic member of a latch in an extended position within a portable IHS; and FIG. 7 provides a cross-section view of an elastic member of a latch within a portable IHS.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
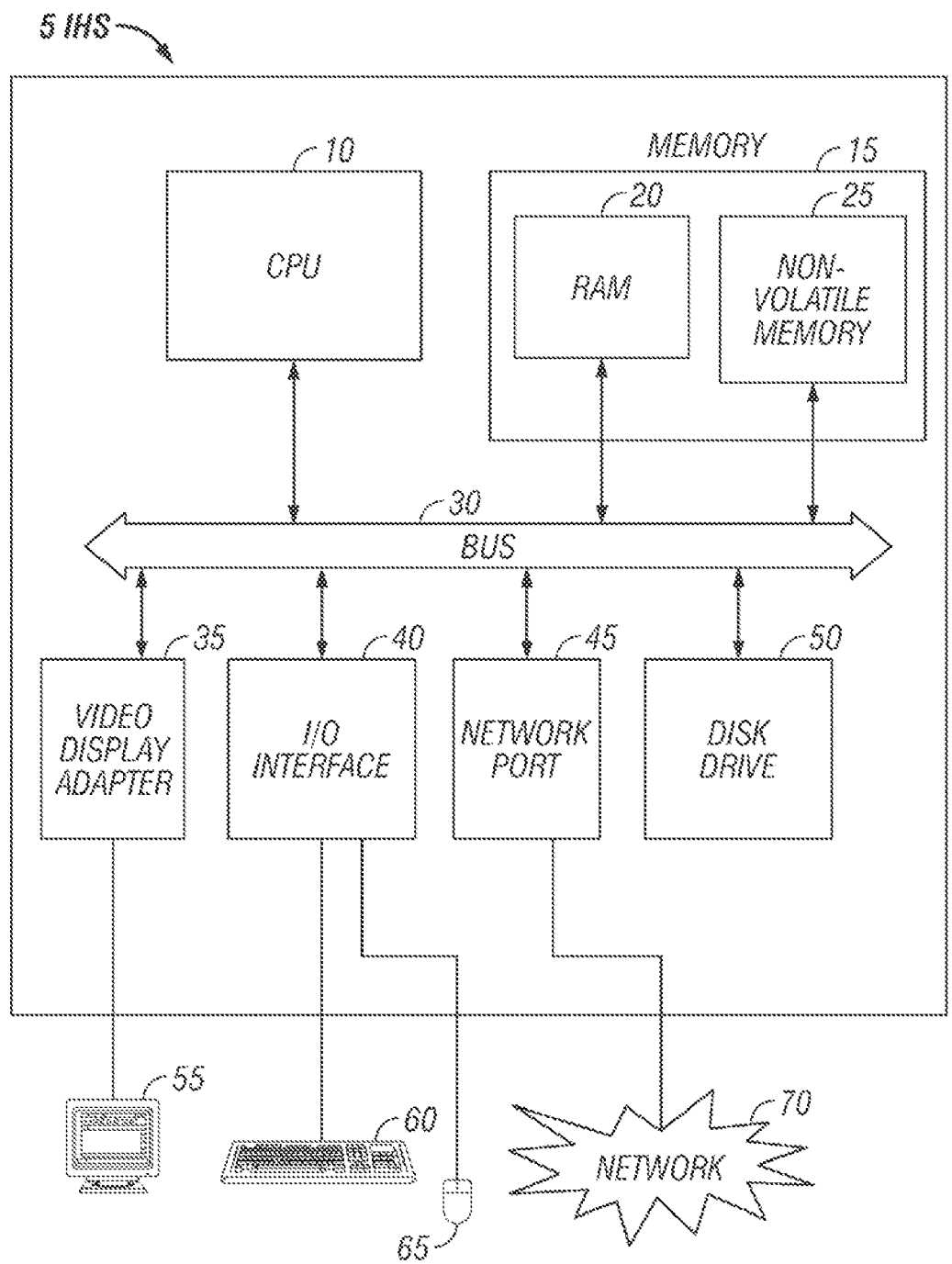
FIG. 1 illustrates an implementation of an information handling system (IHS) according to the present disclosure.

FIG. 1 illustrates one possible implementation of an IHS 5 comprising a CPU 10. It should be understood that the present disclosure has applicability to information handling systems as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory and electrically erasable programmable read-only memory (EEPROM). The firmware program (not shown) may contain, programming and/or executable instructions required to control a keyboard 60, mouse 65, video display 55 and/or other input/output devices not shown here. The memory may also comprise RAM 20. The operating system and application programs may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
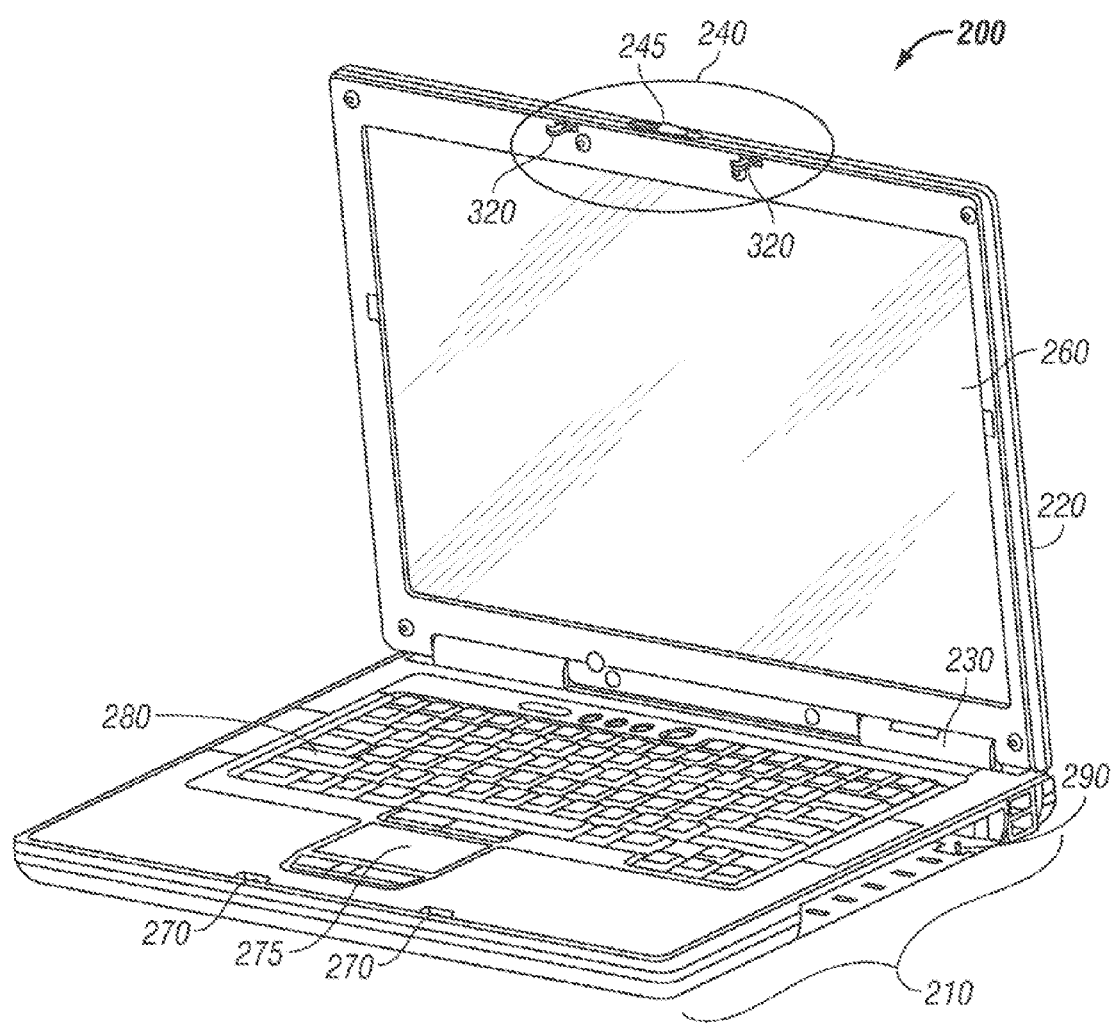
FIG. 2 depicts one possible implementation of a portable IHS.

FIG. 2 illustrates one possible implementation of a portable IHS, shown as a laptop 200 or notebook computer. As described herein, the terms laptop and notebook computer are used synonymously. Other implementations of a portable IHS include, but are not limited to, a personal computer, palmtop PC, MP3 player, handheld device, cell phone, personal digital assistant (PDA), digital camera, foldable electronic device or the like. The laptop 200 may include a base 210 and a top panel 220.

The base 210 is a housing that may contain various components that are used to perform computing operations. Examples of the possible components that may be present in the base 210 are any combination of components mentioned above but not shown in FIG. 2 such as a processor, Random Access Memory (RAM), Read Only Memory (ROM), a hard disk, a video card, memory expansion slots or the like. As shown, drive/card expansion slots 290 in addition to input devices such as a touch pad 275 and a keyboard 280 may also be part of the base 210. It is understood to those skilled in the art that the base 210 may have additional components not mentioned herein or may lack some of the components mentioned herein.

The top panel 220 is coupled to the base 210 at an attachment point 230, such as a hinge or the like, which allows the top panel 220 to pivot between an open and closed position. The top panel 220 in this illustrative example includes a display 260 (e.g., an LCD or Liquid Crystal Display) and may also include speakers (not shown) or other elements. However, in alternative implementations of an IHS, the top panel 220 may not include a display and may only function to protect the base. Further, in other illustrative implementations, some combination of the components previously mentioned as part of the base 210 may be present in the top panel 220 or vice versa. Within the top panel 220 is a latch 240 that allows the top panel 220 to be secured to the base 210 in a closed position. An actuating tab 245 is used to engage or disengage extensions 320 with the slots 270 in the base 210. As shown, 2 extensions 320 and 2 slots 270 may be used, however, any suitable number of extensions and/or slots are contemplated.

Figure 3:
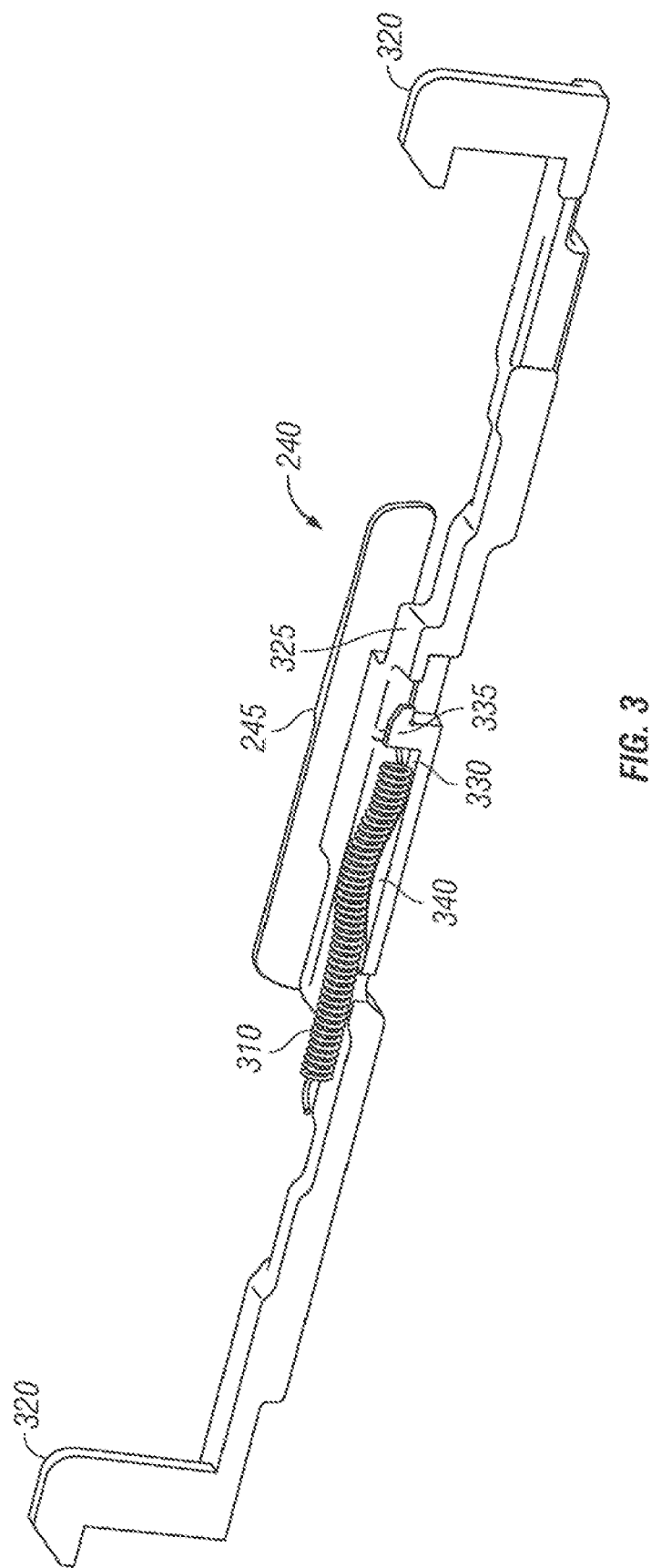
FIG. 3 is an illustrative implementation of a latch in accord with the present disclosure.

In accord with the present disclosure, FIG. 3 provides an illustrative implementation of a latch 240 generally comprising a body 325, an actuating tab 245 and an elastic member 310. The body 325, made of plastic, metal or any other suitable material, may be an elongated structure with extensions 320 on either end. Extensions 320 are elements which extend in a substantially perpendicular manner from the end portions of the body 325 and may be L-shaped, hook-shaped or a similar configuration to engage with slots 270 as seen in FIG. 2. The body 325 also defines a cavity 330 for receiving an elastic member 310. As shown, the cavity 330 resides near the center of the body 325, however, the cavity 330 may be located at any point on the body 325. The body 325 further includes a raised portion 340 to be in contact with the elastic member 310.

Still referring to FIG. 3, the elastic member 310 is shown as a spring. One skilled in the art would appreciate that the elastic member 310 may be a spring in either a coiled or non-coiled orientation, rubber band or any such element possessing a resilient characteristic. The present disclosure also contemplates an elastic member 310 made of metal or any other suitable material. The elastic member 310 allows the latch to be restored to its resting position after the latch 240 is actuated. One end of the elastic member 310 is coupled to a portion of moveable latch 240, for example, anchor 335. A second end of the elastic member 310 is coupled to a fixed anchor on the top panel (not shown). As shown in FIG. 3, the movable anchor 335 may be an L-shaped, hook-shaped or a similarly-shaped portion of the body 240 which provides a point for the elastic member 310 to be attached.

The latch 240 further may include an actuating tab 245 coupled to the body 325. The entire latch 240 may be placed near the edge of a top panel with the actuating tab 245 slightly protruding from the top panel as can be seen in FIG. 2. A user may utilize the actuating tab 245 to move the body 325, including the extensions 320 and movable anchor 335, in the same direction as the movement of the tab 245. In one implementation, an actuating tab 245 affixed to a horizontal edge of a top panel may move in a side-to-side fashion and thus move the body of the latch in a similar side-to-side fashion.

The actuation of the latch 240 resulting from the movement of the actuation tab 245 causes the entire latch 240 to move and facilitate the opening and closing of the top panel 220. When the actuation tab 245 is moved to a first position, such as a disengaged position, the extensions 320 may be aligned with the slots 270 of the base element 210 and thus allow the opening or closing of the top panel 220. Alternatively, the actuation tab 245 may be moved to a second position, when the laptop 200 is in a closed position, for example, which may secure the top panel 220 to the base 210. In this engaged or secured position, the hook portion of the extension 320 is secured within the slot 270 thereby preventing the opening of the top panel 220 unless the tab 245 moves to a disengaged position.

Figure 4:
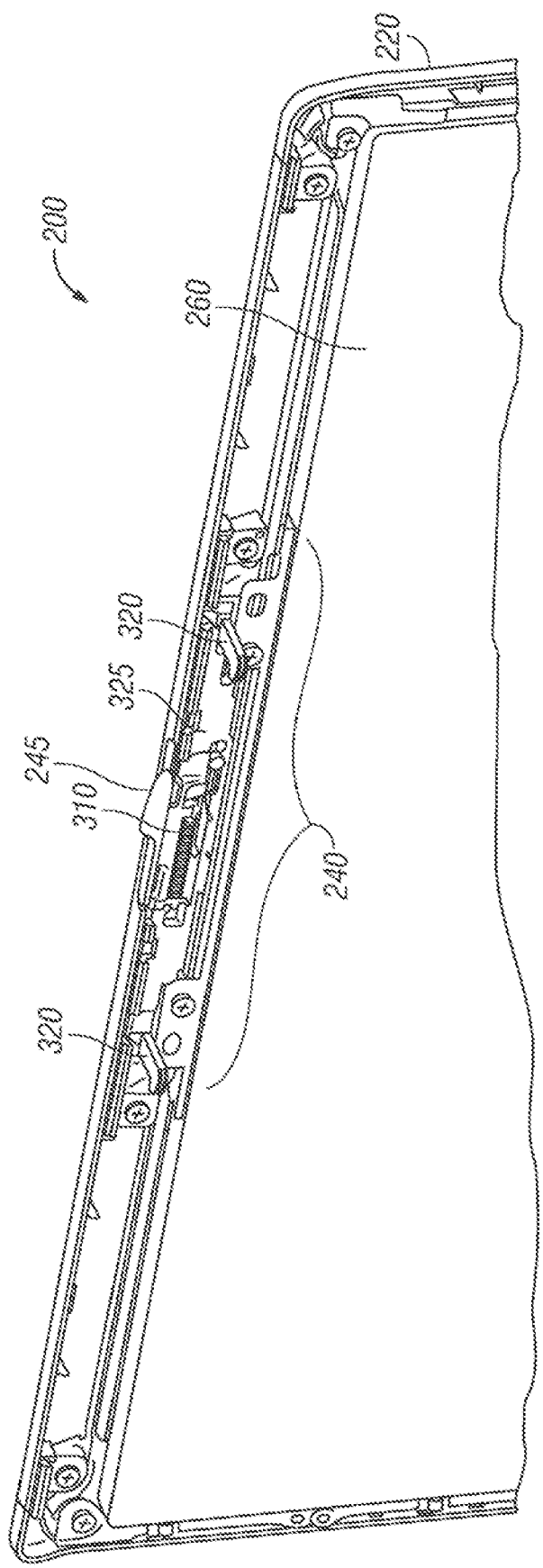
FIG. 4 is a perspective view of a latch within a partially assembled portable IHS.

FIG. 4 provides a perspective view of a latch 240 within a partially assembled top panel 220 of a portable IHS 200. The latch 240 may be affixed to the top panel 220 above the display 260. As shown in FIG. 4 the top panel 220 is in an open position with the actuation tab 245, the body 325 and the elastic member 310 in non-moving positions. The extensions 320 are shown as protruding from the surface of the top panel 220 to be engaged with the base (not shown).

Figure 4A:
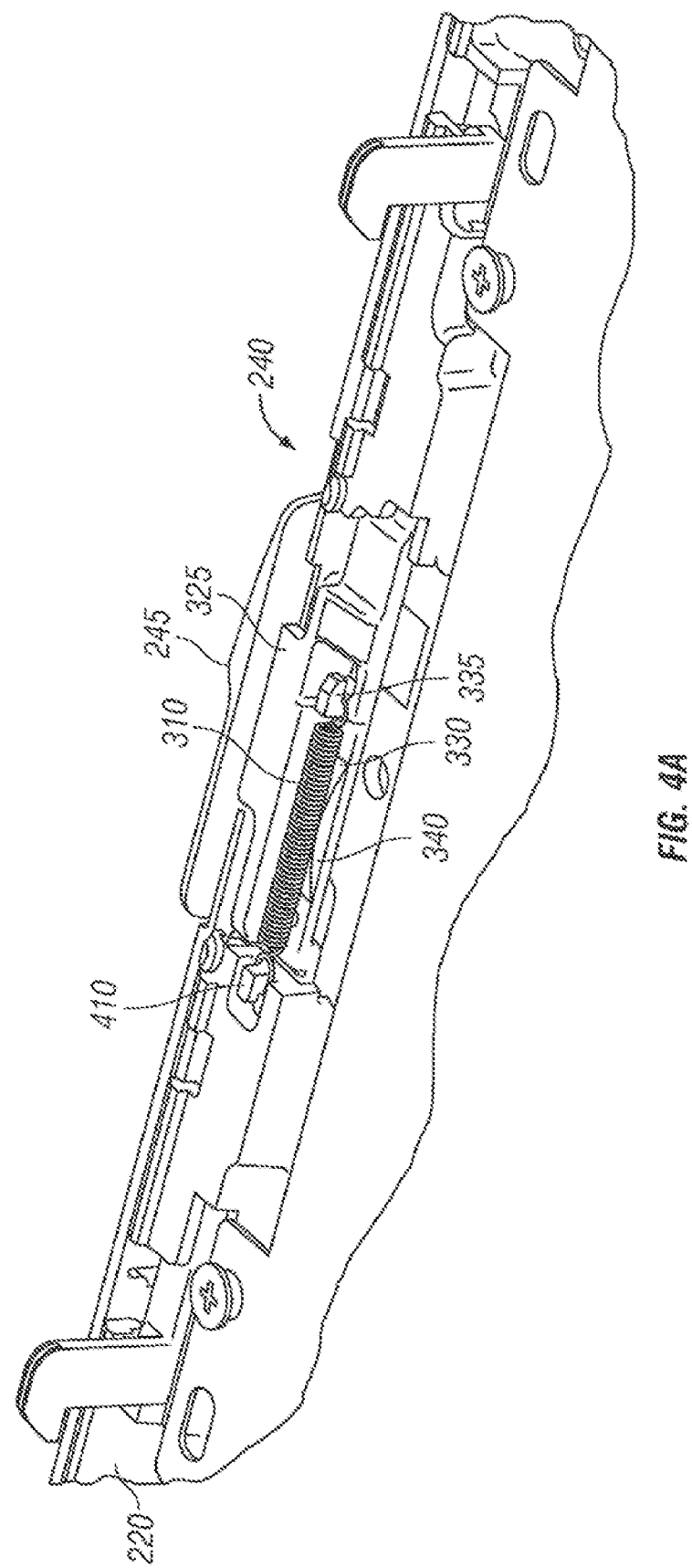
FIG. 4A illustrates a close-up view of a latch within a partially assembled portable IHS.

FIG. 4A shows an close-up view of a latch 240 including an actuation tab 245, body 325 and elastic member 310, within a partially assembled top panel 220 of a portable IHS 200. The elastic member 310 residing within the cavity 330 is attached to a fixed anchor 410 at one end and to a movable anchor 335 at a second end. The fixed anchor 410 may be any portion of the top panel 220 which provides a point for the elastic member 310 to be fixable attached. As shown, the fixed anchor 410 may be an L-shaped, hook-shaped or a similarly-shaped element.

Figure 5:
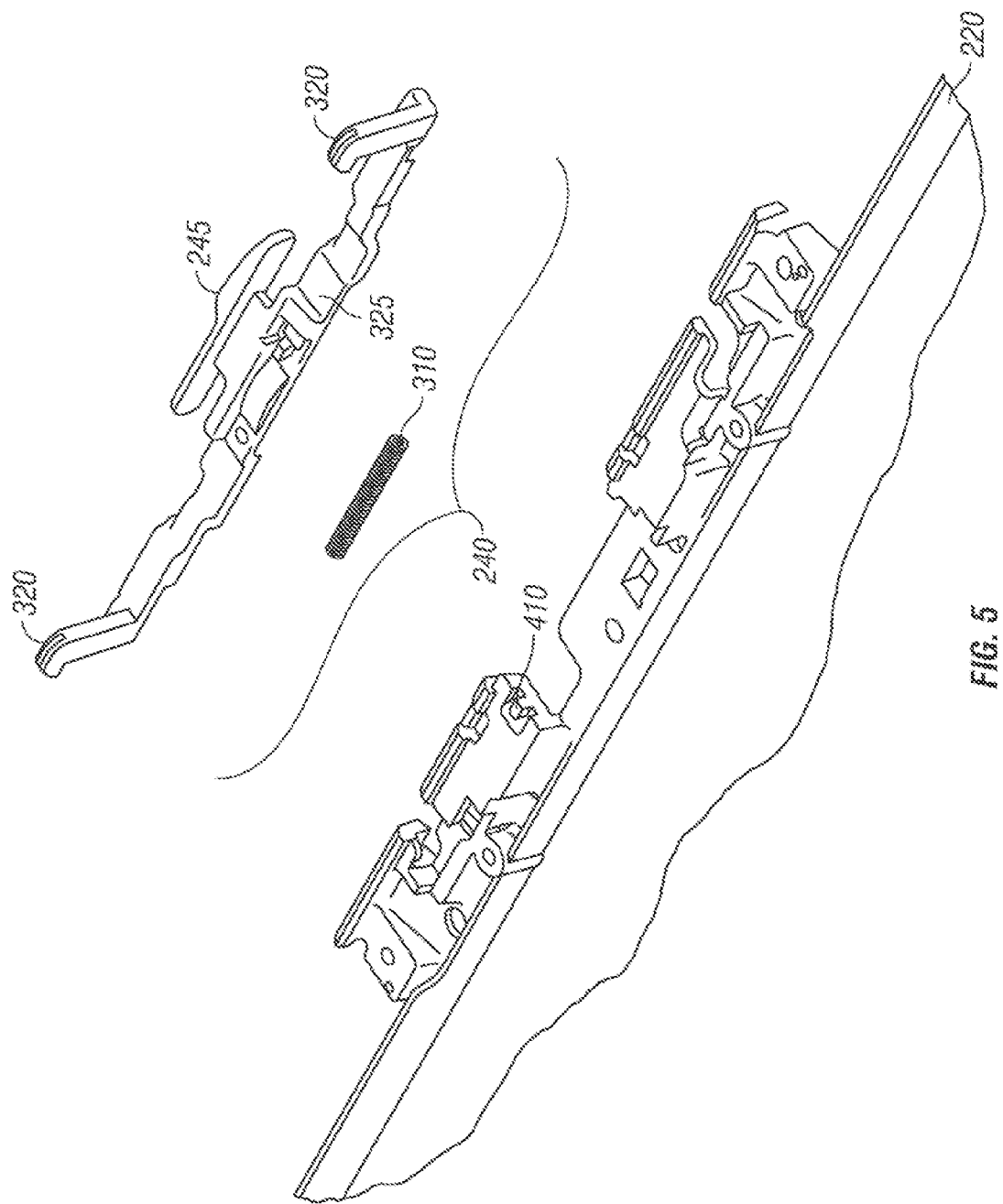
FIG. 5 provides an exploded view of a latch and a portable IHS.

FIG. 5 provides an exploded view of the top panel 220 of a portable IHS and a latch 240 including the actuation tab 245, the body 325 with extensions 320 and the elastic member 310. As shown, the elastic member 310 is completely unattached to the top panel 220 via the fixed anchor 410 and the body 325 via a movable anchor (not shown).

FIG. 6 illustrates an elastic member 310 of a latch 240 in an extended position within a top panel 220 of portable IHS. At one end, the elastic member 310 is attached to a fixed anchor 410. When a user actuates the latch 240 by moving the actuation tab 245, the body 325, including the movable anchor 335, moves causing the elastic member 310 to be in an extended position. FIG. 6 shows that in the extended position, the elastic member 310 is in contact with the raised portion 340. The elastic member 310 and the raised portion 340 may be in contact at all times, even when latch 240 is in the non-extended position. However, in other implementations, the raised portion may only contact the elastic member when a latch is released or after a latch is released from an extended position.

FIG. 7 provides a close-up view of a latch 240 including the body 325 and the actuation tab 245 within a top panel 220 of a portable IHS 200, particularly a cross-section view of an elastic member 310. FIG. 7 may demonstrate the action of an elastic member 310 following actuation and release of the latch 240. The elastic member 310 is shown to vibrate or oscillate between its attachment points to a fixed anchor 410 at one end and to a movable anchor 335 at the second end. The movement or vibration of the elastic member 310 may be in a transverse, longitudinal or both transverse and longitudinal direction. The raised portion 340 may contact the elastic member 310 to damp its movement or vibration following actuation of the latch 240. Consequently, the audible noise or "twang" sound caused by the elastic member 310 may be quieted, reduced or nearly eliminated as compared to elastic members in apparatus and/or systems beyond the present disclosure.

The use of a raised portion as an integral element of a latch also provides benefits over other vibration reduction methods and apparatus. Other methods which include the use of separate parts to damp spring vibration may present increased cost and assembly time as compared to the apparatus, systems and methods of the present disclosure. Furthermore, the raised portion which may be made of the same material as the latch and may sustain the wear and tear of the spring contact for a longer period than the known alternative methods of reducing spring vibration. The raised portion 340 may also be curved in a manner which prevents the spring from catching on it, thereby maintaining the operability of the spring.

A person of skill in the art would appreciate, upon consideration of the above disclosure and accompanying drawings, that numerous modifications, additions, substitutions, variations, deletions and other changes may be made without departing in any way from the spirit or scope of the present disclosure and/or claims below. The embodiments, implementations and/or aspects of the present disclosure are, therefore, to be considered in all respects as illustrative and not restrictive.

What is claimed is:

1. A latch assembly for securing a top panel to a base of an information handling system (IHS), the latch assembly comprising:
    a latch body attachable to the top panel and slidable between a latched and an unlatched position, the latch body defining a cavity having a raised portion, a movable anchor, and one or more latch extensions for engaging with the base of the IHS;
    an actuation tab coupled to the latch body to operate the latch body toward the unlatched position to disengage the one or more latch extensions from the base of the IHS;
    an elastic member positioned within the cavity to bias the latch body toward the latched position, the elastic member having a first end attached to a fixed portion of the top panel and a second end attached to the movable anchor, the elastic member in contact with the raised portion;
    wherein, the raised portion is configured to damp any vibration of the elastic member when the latch body is moved between the latched and the unlatched position.

2. The latch in claim 1, wherein the one or more extensions are hook-shaped members.

3. The latch in claim 1, wherein the elastic member is a spring.

4. The latch in claim 1, wherein the actuation tab is coupled to the top panel, the actuation tab used to engage the latch in a movable position within the top panel.

5. The latch in claim 1, wherein audible noise caused by the elastic member is reduced when the raised portion is in contact with the elastic member.

6. A portable information handling system (IHS) comprising:
    a top panel;
    a base, wherein the base is pivotally coupled to the top panel at an attachment point; and
    a latch assembly attachable to the top panel, the latch assembly comprising:
    a latch body attachable to the top panel and slidable between a latched and an unlatched position, the latch body defining a cavity having a raised portion, a movable anchor, and one or more latch extensions for engaging with the base of the IHS;

an actuation tab coupled to the latch body to operate the latch body toward the unlatched position to disengage the one or more latch extensions from the base of the IHS;

an elastic member positioned within the cavity to bias the latch body toward the latched position, the elastic member having a first end attached to a fixed portion of the top panel and a second end attached to the movable anchor, the elastic member in contact with the raised portion;

wherein, the raised portion is configured to damp any vibration of the elastic member when the latch body is moved between the latched and the unlatched position.

7. The IHS in claim 6, wherein the one or more extensions are hook-shaped members.

8. The IHS in claim 6, wherein the elastic member is a spring.

9. The IHS in claim 6, wherein the actuation tab is coupled to the top panel, the actuation tab used to engage the latch in a movable position within the top panel.

10. The IHS in claim 7, wherein audible noise caused by the elastic member is reduced when the raised portion is in contact with the elastic member.

11. A method for damping vibration of an elastic member within a latch assembly of an information handling system (IHS), wherein the latch assembly is attached to a top panel of the IHS, and comprises a latch body slidable between a latched and an unlatched position, the latch body defining a cavity having a raised portion, a movable anchor, one or more latch extensions for engaging with the base of the IHS and an actuation tab coupled to the latch body to operate the latch body toward the unlatched position to disengage the one or more latch extensions from the base of the IHS;

the method comprises:

positioning the elastic member within the cavity and in contact with the raised portion, having one end attached to a fixed portion of the top panel and the other attached to the movable anchor, wherein, the raised portion is configured to damp any vibration of the elastic member when the latch body is moved between the latched and the unlatched position.

12. The method of claim 11, wherein the one or more extensions are hook-shaped members.

13. The method of claim 11, wherein the elastic member is a spring.

14. The method of claim 11, wherein the actuation tab is coupled to the top panel, the actuation tab used to engage the latch in a movable position within the top panel.

15. The method of claim 13, audible noise caused by the elastic member is reduced when the raised portion is in contact with the elastic member.

* * * * *